(12) United States Patent
Nittka (10) Patent No.: US 9,160,857 B2
(45) Date of Patent: Oct. 13, 2015

(54) METHOD FOR THE OPERATION OF A SYSTEM AND SYSTEM FOR THE ADMINISTRATION OF CALLS TO A CALL CENTER

(71) Applicant: Vodafone Holding GmbH, Dusseldorf (DE)

(72) Inventor: Niko Nittka, Frankfurt (DE)

(73) Assignee: Vodafone Holding GmbH, Dusseldorf (DE)

( * ) Notice: Subject to any disclaimer, the term of this patent is extended or adjusted under 35 U.S.C. 154(b) by 0 days.

(21) Appl. No.: 13/911,459

(22) Filed: Jun. 6, 2013

(65) Prior Publication Data

US 2014/0153711 A1  Jun. 5, 2014

(30) Foreign Application Priority Data

Jun. 6, 2012  (DE) .......................... 10 2012 011 245

(51) Int. Cl.
| | |
|---|---|
| *H04M 3/00* | (2006.01) |
| *H04M 5/00* | (2006.01) |
| *H04M 3/523* | (2006.01) |
| *H04M 3/51* | (2006.01) |

(52) U.S. Cl.
CPC .......... *H04M 3/5231* (2013.01); *H04M 3/5238* (2013.01); *H04M 3/5166* (2013.01)

(58) Field of Classification Search
USPC ........ 379/265.01, 265.1, 265.11, 266.01, 309
See application file for complete search history.

(56) References Cited

U.S. PATENT DOCUMENTS

| | | | | |
|---|---|---|---|---|
| 5,311,574 | A * | 5/1994 | Livanos | 379/209.01 |
| 5,724,404 | A * | 3/1998 | Garcia et al. | 379/32.02 |
| 6,125,178 | A * | 9/2000 | Walker et al. | 379/211.01 |
| 6,879,683 | B1 | 4/2005 | Fain et al. | |
| 7,085,366 | B2 * | 8/2006 | O'Neil | 379/265.01 |
| 2008/0063180 | A1 | 3/2008 | Barsness et al. | |
| 2010/0189250 | A1 | 7/2010 | Williams et al. | |

FOREIGN PATENT DOCUMENTS

| | | |
|---|---|---|
| EP | 0426361 A2 | 5/1991 |
| WO | WO0154388 A1 | 7/2001 |
| WO | 2010087966 A2 | 8/2010 |

* cited by examiner

*Primary Examiner* — Quynh Nguyen
(74) *Attorney, Agent, or Firm* — Grossman Tucker Perreault & Pfleger, PLLC (57) ABSTRACT

A method is provided for the operation of a system for the administration of calls to a call center. A first call initiated by a caller using a call number allocated to the call center is automatically received and held in a waiting queue. A waiting position with respect to the first call is determined and the first call is ranged in the waiting queue corresponding to the determined waiting position. The calls held in the waiting queue are forwarded one after the other to an available call center agent. The first call is terminated within a time interval if the call has not been forwarded, and a second call to the caller is initiated by using a recorded call number. If the second call is answered, the second call will be ranged in the waiting queue, wherein the waiting position is determined in consideration of the first call.

18 Claims, 4 Drawing Sheets

METHOD FOR THE OPERATION OF A SYSTEM AND SYSTEM FOR THE ADMINISTRATION OF CALLS TO A CALL CENTER

TECHNICAL FIELD

The present invention relates to a method for the operation of a system and a system for the administration of calls to a call center, wherein by the system a first call initiated by a caller using a call number allocated to the call center is automatically received, the first call is held in a waiting queue comprising other calls waiting to be forwarded to a call center agent until it is forwarded to a call center agent, a waiting position with respect to the first call is determined in the waiting queue, the first call is ranged in the waiting queue corresponding to the determined waiting position and the calls held in the waiting queue are forwarded one after the other to a call center agent if such an agent is available, wherein the waiting positions of the calls which are still held in the waiting queue are respectively adapted.

BACKGROUND INFORMATION

Call centers generally serve for carrying out different telecommunication tasks and are especially used by companies for offering their clients services such as advisory service, product help or sale. The present invention relates in particular to the administration of calls to so called inbound call centers which receive calls from clients in contrast to so called outbound call centers in which persons are called by call center agents, for example in order to win these persons as potential clients or for market research purposes.

Call centers can usually be reached under a particular service call number under which callers are connected to corresponding employees of the call center, so called call center agents. For the administration of the incoming calls, which in particular means the distribution of incoming calls to free call center agents, the forwarding to corresponding call center agents as well as the control or command of incoming calls until they are forwarded to a free call center agent, different systems or telephone installations are known in the state of the art. A substantial component of such systems or installations is a so called automatic call distribution (ACD; ACD: Automatic Call Distribution). This automatic call distribution holds incoming calls in a waiting queue comprising other calls waiting to be forwarded to a call center agent until they are forwarded to a call center agent. The calls are usually distributed or forwarded according to the so called FIFO principle (FIFO: First in-First out), i.e. incoming calls are forwarded to a free call center agent in succession according to their incoming time, wherein the call which has been received at first will be the first to be forwarded. Furthermore, the so called "longest-idle" principle is often applied, according to which a call to be forwarded from the waiting queue is forwarded to such call center agent whose last communication is dated back farthest.

However, the systems and methods for the operation of systems for the administration of calls to a call center which are known in the state of the art comprise disadvantages.

In particular for avoiding misuse of the service call numbers provided for reaching the call center by unserious calls which bind the call center agents unnecessarily and thus cause longer waiting times for the clients, calls to a call center are usually not free of charge. Since an incoming call usually cannot be immediately transferred to a call center agent and therefore has to be put in the waiting queue, as already mentioned, it is a problem that the caller is also charged for the waiting time he is spending in the waiting queue. Due to the charged costs, the callers evaluate or perceive corresponding waiting times as highly negative. For reducing the costs, it has been regulated by law in some countries (for example in Germany from the 1 Sep. 2012) that a caller may not be held for fees in a waiting loop. For technical reasons however, no waiting loops which are free of charge and which exceed 120 seconds can be realized at the moment in the common call number lanes of the German networks as well as in the mobile networks. Since it is usually impossible to assure that a call is forwarded to a call center agent or a call is received by a call center agent within 120 seconds, since this would lead to high staff costs, corresponding calls have to or would have to be ended by the system with the request to call again later. Since in such a case the caller's wish cannot be immediately dealt with, this will lead to a customer's dissatisfaction and a negative evaluation by the caller.

Systems or telephone installations known in the state of the art for the administration of calls to a call center solve this problem partially in that a caller can leave his call number and the caller will be called back when a free agent is available. As in particular the time distances between the call initiated by a caller and the ring back by a call center agent often comprise several hours, there are in particular the disadvantages that the ring back might no more reach the caller or another person than the caller answers the phone or the caller has already otherwise dealt with his wish. Since the call center agent is not available for other callers during such calls, these ring backs entail considerable costs for the call center or the company which operates the call center. Furthermore, it is more difficult to realize corresponding ring backs by the call center agents in a process.

SUMMARY

On the base of these facts, it is the object of the present invention to provide an improved method for the operation of a system for the administration of calls to a call center as well as an improved system for the administration of calls to a call center, by means of which the convenience for the callers is increased and the efficiency is improved for the operator of the call center.

For technically achieving this aim, the invention proposes a method for the operation of a system and a system for the administration of calls to a call center, wherein by the system a first call initiated by a caller using a call number allocated to the call center is automatically received, the first call is held in a waiting queue comprising other calls waiting to be forwarded to a call center agent until it is forwarded to a call center agent, a waiting position with respect to the first call is determined in the waiting queue, the first call is ranged in the waiting queue corresponding to the determined waiting position, and the calls held in the waiting queue are forwarded one after the other to a call center agent if such an agent is available, wherein the waiting positions of the calls which are still held in the waiting queue are respectively adapted, which method is characterized in that by the system a call number of the caller is recorded with the first call, the first call is terminated within a predetermined time interval if the call has not been forwarded, a second call to the caller is initiated by using the recorded call number and if the second call is answered, the second call will be ranged in the waiting queue, wherein the waiting position within the waiting queue is determined in consideration of the first call. Advantageously, the terminating of the first call by the system initiates the second call by the system. Herein, the terminating of the first call advantageously triggers the immediately or directly subsequent initiation of the second call by the system. The second call can thus be automatically made by the system immediately after having terminated the first call.

The invention is based upon the knowledge that a method for the operation of a system for the administration of calls to a call center can be improved in that a call made by a caller to the call center will be terminated by the system within a predetermined time interval, for example a time interval of 120 seconds prescribed by law, if the call has not been forwarded, and the caller will be quasi seamlessly returned to the waiting loop by a ring back of the system, wherein the caller advantageously keeps the waiting position in the waiting queue which had been allocated to the call initiated by the caller. Thanks to the ring back initiated by the system the caller is thus advantageously forwarded to a call center agent as quickly as if the call initiated by the caller had been held in the waiting queue. Herein, the costs to be borne by the caller are advantageously reduced, since he only has to bear them until the connection is terminated by the system. Thanks to the immediate ring back by the system after having terminated the call initiated by the caller, the caller will be advantageously also reachable again, i. e. the problem that another person than the caller answers the incoming ring back will be avoided.

According to an advantageous embodiment of the method according to the invention it is provided that the channel used by the first call for a communication connection between the caller and the call center will be reserved for the second call after the system has terminated the first call. The channel will then be advantageously used for a communication connection from the call center to the caller. Hereby it is advantageously assured that corresponding resources for calling the caller back are available. Furthermore, the use of the same channel for the ring back advantageously simplifies the system-internal administration of the ring back.

According to an especially preferred embodiment of the invention it is provided that the time of arrival of the first call is recorded. The waiting position in the waiting queue is advantageously determined in consideration of the recorded time. The recording of the time of arrival of the first call by the system is realized in an absolute manner in an advantageous embodiment of the invention, advantageously by recording the date and the time of the incoming call, and/or in a relative manner, advantageously in relation to calls which have come in before and calls which have come in subsequently.

According to an especially advantageous embodiment of the invention, the time of arrival of the first call is allocated to the recorded call number of the caller, the waiting position of the second call in the waiting queue is determined by the time allocated to the call number and the second call is ranged in the waiting queue according to the determined waiting position. Herein, the system can use the recorded call number which has been advantageously memorized in a database for allocating the time of arrival of the first call which has been advantageously also memorized in a database to the second call, such that the waiting position of the second call within the waiting queue can be determined in consideration of the first call and the second call is thus ranged in the waiting queue at the place where also the first call would be ranged in the waiting queue. This way of considering the first call for the determination of the waiting position within the waiting queue does advantageously not require that a real waiting position has to be recorded and memorized, since on the base of the respective times of the different calls it can be respectively determined in an unequivocal manner in which order the respective calls have to be forwarded to the respective call center agents.

According to another advantageous variant of the present invention, the waiting position which has been determined with respect to the first call is allocated to the recorded call number and the second call is ranged in the waiting queue corresponding to the waiting position allocated to the recorded call number. Herein, the waiting position is advantageously determined only once and is only adapted correspondingly in the following if calls held in the waiting queue are forwarded. Thus, on the base of the first call, the waiting position in the waiting queue is also maintained for the second call. In some exemplary embodiments of the present invention, the second call is thus allocated to a free call center agent on the base of the allocated or determined waiting position of the first call.

According to another advantageous aspect of the present invention, the waiting position is determined in consideration of still other criteria. Advantageous other criteria are in particular the frequency of calls initiated by the caller, a predeterminable status allocated to a call number of a caller and/or a total waiting time in the waiting queue of the system which results from several calls of a caller. In consideration of these criteria, calls can be preferably positioned more ahead than only in consideration of the time of arrival of the first call. A status can be for example allocated to premium customers by means of which status the waiting position determined on the base of the time of arrival of the first call is automatically shifted towards the head of the waiting queue by a predetermined number of waiting positions and thus enables an earlier or faster forwarding to a call center agent. Corresponding criteria are advantageously linked by the system of a particular call number and this linkage can be used for determining a waiting position of a call in a waiting queue.

Another advantageous embodiment of the method according to the invention provides that a waiting position allocated to a recorded call number is correspondingly adapted each time when calls held in the waiting queue are forwarded. Herein, a waiting position allocated to a call number is advantageously treated by the system like a call being held in the waiting queue. The waiting position is advantageously reserved for the second call by a placeholder allocated to the call number. This is in particular advantageous if the ring back initiated by the system cannot be immediately transferred to the caller since hereby the waiting position which the caller has acquired with respect to the first call is shifted ahead in the waiting queue and the waiting position is thus maintained for the caller as soon as the ring back initiated by the system is received by the caller. A waiting position allocated to a recorded call number, which waiting position has been put first in the waiting queue and is thus entitled to be forwarded to the next available call center agent remains allocated to the recorded call number, if the first call has been terminated and a second call has not yet been accepted, preferably by using a placeholder allocated to the call number. In such a case, the system advantageously forwards the call which is the next one in the waiting queue to an available call center agent. For this, the system advantageously checks whether a first or a second call is allocated to a waiting position which entitles to be forwarded to the next available call center agent and whether the waiting position is reserved by a placeholder for a second call which still has to be initiated. According to another advantageous embodiment of the invention, a waiting position which requires immediate forwarding remains allocated to a call number as long as the caller has been forwarded to a call center agent or another predefined time interval has passed by. The consideration of another predefined time interval advantageously enables the system to de-allocate or delete such waiting positions allocated to a call number or waiting positions reserved by a placeholder, to the allocated call number of which the system cannot build up a communication connection, for example because a call number has been wrongly recorded by the system and/or wrongly entered by a caller.

Another advantageous embodiment of the invention provides that upon initiation of the first call, the call number allocated to the terminal of the caller will be transmitted to the system via a communication connection established between the terminal and the call center. Herein, the transmitted call number is advantageously recorded by the system as call number of the caller. For this purpose, both the terminal of the caller and the system for the administration of the incoming calls advantageously support the so called CLIP function (CLIP: Calling Line Identification Presentation). If the call number is correspondingly transmitted, no further entries have to be made by the caller within the scope of the recording of the call number by the system. Wrong entries can thus be advantageously avoided.

If a caller has activated the CUR function (CLIR: Calling Line Identification Restriction) such that the transmission of the call number to the called subscriber, i.e. the call center, is suppressed, it is provided according to an advantageous improvement of the method that the caller is asked for permission to record his call number for a ring back. Herein, it is made use of the fact that the call number of the caller is known to the provider of the network and can thus be determined.

According to another advantageous aspect of the present invention, the first call received by the system is connected to a voice dialogue system (IVR system: Interactive Voice Response). The voice dialogue system advantageously allows callers to hold at least partially automatised dialogues with the system in which reasons for the call can already be determined. These reasons can advantageously be indicated to the call center agent at a later time such that the call center agent can already get a better idea of the caller's wishes in advance before the caller is forwarded to him. Furthermore, calls can be filtered in dependence on the determined reasons for a call and can be forwarded to such call center agents who are competent with respect to the respective reasons.

According to an advantageous embodiment of the invention it is furthermore provided that the caller is requested in a dialogue with the voice dialogue system to enter a call number for recording a caller's call number. Herein, the call number is advantageously entered by the caller by means of the keyboard of the caller's terminal and/or by voice entry. The call number entered by the caller in the dialogue with the voice dialogue system is advantageously recorded by the system as the caller's call number. The call number entered by the caller can advantageously differ from the call number which is allocated to the terminal used for the first call. If a caller has for example called from a landline, the ring back initiated by the system can then go to a mobile phone.

Furthermore it is proposed that if the second call is not answered, at least one further second call will be initiated by the system. Advantageously it can be predefined how often the system shall repeat the attempt to call back and/or it can be predefined in which time interval attempts to call back a call number are initiated by the system. For example it can be predefined that the system will initiate up to ten attempts to call back within a settable time interval if the called person is not answering the call or that a ring back will be periodically initiated within some few seconds if the line of the called person is busy.

Another advantageous embodiment of the invention is characterized in that respectively different groups of call center agents are responsible of respectively different caller wishes and a waiting queue is allocated to each group for holding calls to be forwarded to call center agents who belong to the respective group, wherein a waiting position in each one of the waiting queues is determined with respect to the first call in consideration of the first call, preferably in consideration of the recorded time of arrival of the first call. If a caller is forwarded to a call center agent, it is advantageously provided that a waiting position in the other waiting queues will be kept for the caller in order to be able to range the caller in another one of the waiting queues at the respective waiting position if the call center agent wants to forward the caller to another call center agent or to another group of call center agents. If a call is forwarded by a call center agent to another call center agent or to another group of call center agents, the waiting position in the respective waiting queue allocated to the other call center agent or to the other group of call center agents will be determined, according to an advantageous variant, in consideration of the time of arrival of the first call that is allocated to the call number of the call to be forwarded and in consideration of the times that are allocated via the call numbers to the other calls waiting in the waiting queue, and the call to be forwarded will be ranged in the waiting queue according to the determined waiting position. With such forwarding, the caller is advantageously not ranged at the end of an existing waiting queue, such that corresponding waiting times for the caller are shortened and the convenience for the caller is increased.

For solving the initially mentioned problem, the present invention furthermore proposes a system for the administration of calls to a call center, which system is characterized by means for carrying out a method according to the invention. Advantageously, the system comprises means for receiving calls; means for recording a call number; means for recording the time of arrival of a call; means for allocating a recorded time of an incoming first call to a recorded call number; means for determining a waiting position in the waiting queue; means for ranging a call in the waiting queue corresponding to the determined position; means for holding calls in a waiting queue; means for adapting a waiting position in the waiting queue; means for recording the waiting time of a first call in the waiting queue; means for terminating a call; means for initiating a call; means for holding a waiting position in a waiting queue; means for allocating a waiting position to a call number; and/or means for forwarding a call. Advantageously, the system furthermore comprises a voice dialogue system and/or a database. Advantageously, the means of the system can be used in combination with call distribution applications (ACD) known from the state of the art, preferably for additional performances.

BRIEF DESCRIPTION OF THE DRAWINGS

Other advantageous details, features and embodiments of the invention will be explained in detail in the following by means of the exemplary embodiments represented in the figures of the drawing. Herein.

DETAILED DESCRIPTION

Figure 1:
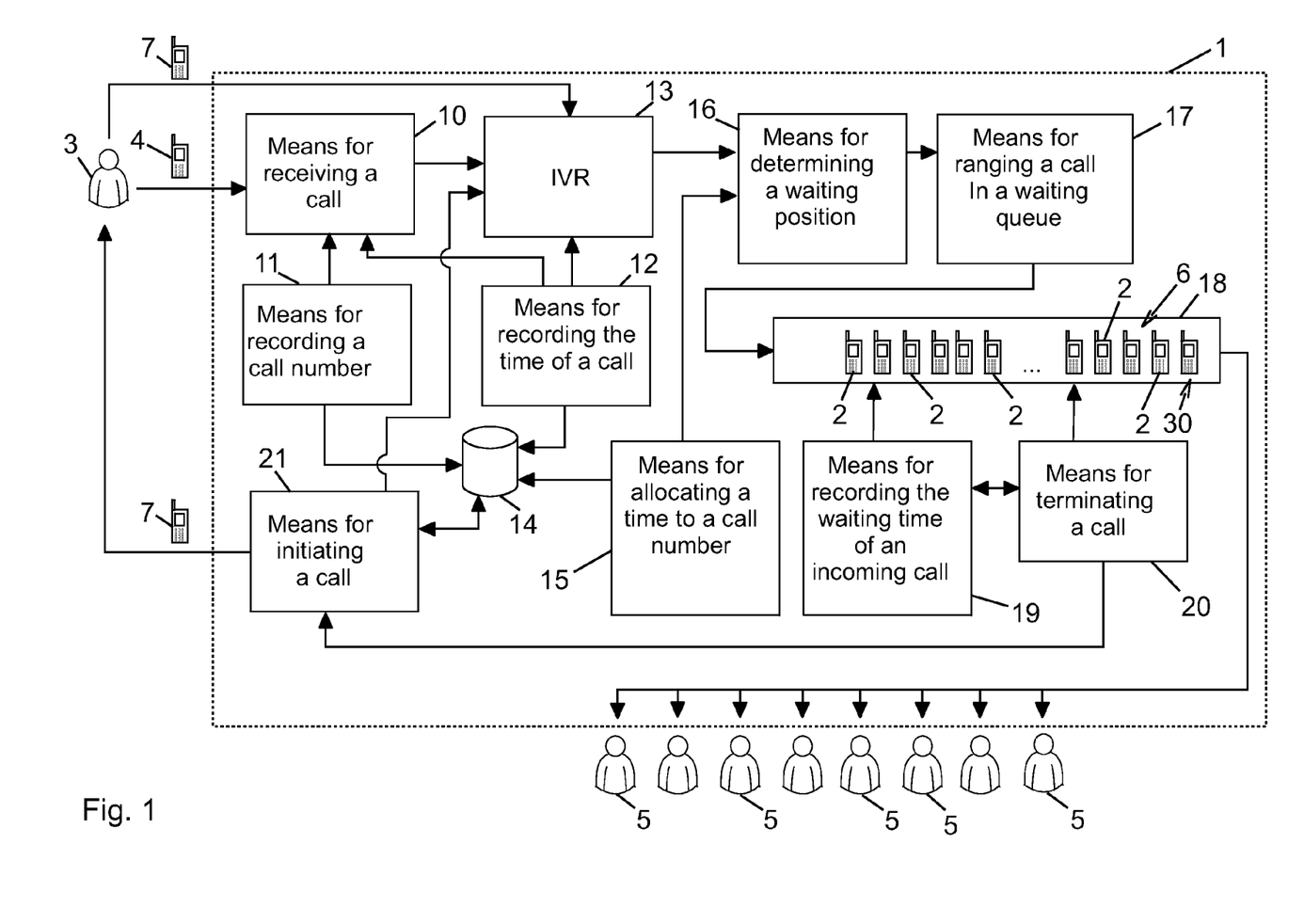
FIG. 1 is a schematic diagram of an exemplary embodiment of a system according to the invention during execution of a method according to the invention.

FIG. 1 is a schematic diagram which represents an exemplary embodiment of a system 1 according to the invention for the administration of calls to a call center. Components of the system which are to be accentuated are represented in a simplified manner by corresponding blocks. Components of a corresponding system for the administration of calls to a call center which are less essential for the present invention have not been represented for reasons of clarity.

The system 1 is advantageously adapted to automatically receive a first call 4 initiated by a caller 3 who uses a call number allocated to the call center, to hold the first call 4 in a waiting queue 6 comprising other calls 2 waiting to be forwarded to a call center agent 5 until it is forwarded to a call center agent 5, to determine a waiting position with respect to the first call 4 in the waiting queue 6, to range the first call 4 in the waiting queue 6 corresponding to the determined waiting position, to forward the calls 2 held in the waiting queue 6 one after the other to a call center agent 5 if such an agent 5 is available, wherein the waiting positions of the calls 2 which are still held in the waiting queue 6 are respectively adapted, to record a call number of the caller 3 with the first call 4, to terminate the first call 4 within a predetermined time interval if the call 4 has not been forwarded, to initiate a second call 7 to the caller 3 by using the recorded call number and if the second call 7 is answered, to range the second call 7 in the waiting queue 6, wherein the system determines the waiting position within the waiting queue 6 in consideration of the first call 4, preferably in consideration of the time of arrival of the first call 4. For this, the system 1 comprises different means. According to the invention it is provided that these means are realized as hardware and/or software.

The system 1 in particular comprises means 10 for receiving a call, means 11 for recording a call number, means 12 for recording the time of a call, a voice dialogue system (IVR) 13, a database 14 in particular for memorizing recorded call numbers and for memorizing the recorded times of arrival of calls, means 15 for allocating a time to a call number, means 16 for determining a waiting position, means 17 for ranging a call in a waiting queue, means 18 for holding calls in a waiting queue, means 19 for recording the waiting time of an incoming call, means 20 for ending a call and means 21 for initiating a call.

The arrows represented in FIG. 1 which connect the means serve to better understand how the represented system administrates incoming calls and how the different means of the system interact with each other. It can however not be deduced from the arrows that a corresponding signal flow is only realized into the respective direction of the arrow or that means which are not connected by arrows cannot directly interact with each other. Instead, it is advantageously provided that the means can directly exchange information between each other.

The exemplary embodiment of a system 1 according to the invention represented in FIG. 1 or the means provided by the system 1 are configured to automatically receive a first call 4 (calls are symbolically represented by a telephone symbol) initiated by a caller 3 using a call number that is allocated to the call center. A call number transmitted with the call 4 is recorded by the means 11 for recording a call number and the call number is memorized in the database 14. Furthermore, the time of arrival of the call 4 is recorded by the means 12 for recording the time of a call and also memorized in the database 14. The time of arrival of the first call 4 is allocated to the recorded call number using the means 15 for allocating a time to a call number. The call 4 is transferred to the voice dialogue system 13 and ranged in a waiting queue 6. For ranging the call 4 in the waiting queue 6, a waiting position for the call 4 is determined using the means 16 for determining a waiting position in consideration of the time of arrival of the call 4 and the call 4 is ranged in the waiting queue 6 in consideration of the determined waiting position by means of the means 17 for ranging a call in a waiting queue. The ranging in the waiting queue 6 according to the invention is explained in more detail in connection to FIGS. 2a through 2e. An explicit representation in FIG. 1 has been left out for reasons of clarity.

While the call 4 is held in the waiting queue 6 by the means 18 for holding a call in a waiting queue 6, a waiting announcement is made by the voice dialogue system 13, for example: "Dear customer, unfortunately no free call center agent 5 is available at the moment. Your call will be put on hold.". While the first call 4 is held in the waiting queue 6, the means 19 for recording the waiting time of an incoming call determine with respect to the first call 4 for how long this call 4 has already been put on hold in the waiting queue 6. According to the represented exemplary embodiment it is provided that a call is for example no longer held in the waiting queue 6 than 120 seconds. If a caller 3 has not been forwarded to a call center agent 5 within a predetermined time interval of for example 120 seconds, the call 4 will be terminated by the means 20 for ending a call. The communication connection between the caller 3 and the call center is interrupted. Well before the waiting time of 120 seconds has passed by, an announcement is made to the caller 3 by the voice dialogue system 13, for example: "Unfortunately all our employees are still in conversations. In order to ensure that you do not incur any costs, we will call you back at once. Please hang up now, you will be called back immediately.". After the system 1 has terminated the first call 4, the channel which has been used for the first call 4 for a communication connection between the caller 3 and the call center will be reserved for the second call 7.

Upon terminating the call 4, the means 21 for initiating a call will initiate a second call 7 to the caller 3 by using the caller's call number which has been recorded and memorized in the database 14. This means that a ring back or a second call 7 to the caller will be initiated even if no call center agent 5 has become free. The reserved channel is used for a communication connection from the call center to the caller 3. If the caller 3 accepts the second call 7, the caller 3 will be directly connected again to the voice dialogue system 13. Herein, the voice dialogue system 13 signalizes the caller 3 that he is again connected to the call center, for example by the following announcement: "This is company XY. Please be patient, the next free employee is reserved for you. We cover the costs of your call." Furthermore, a waiting position in the waiting queue 6 will be determined for the second call 7 by the means 16 for determining a waiting position of a call. For this, it is referred to the time of arrival of the first call 4 which has been allocated to the call number and memorized in the database 14. If a corresponding waiting position has been determined, the second call 7 is ranged in the waiting queue 6 by the means 17 for ranging a call in a waiting queue 6. The operation of ranging a call in the waiting queue 6 is explained in more detail in connection to FIG. 2a through FIG. 2e and is not explicitly represented in FIG. 1. If the second call 7 has advanced to the first position in the waiting queue 6, the call will be forwarded to a call center agent 5 as soon as the next call center agent 5 is available.

Figures 2A, 2B:
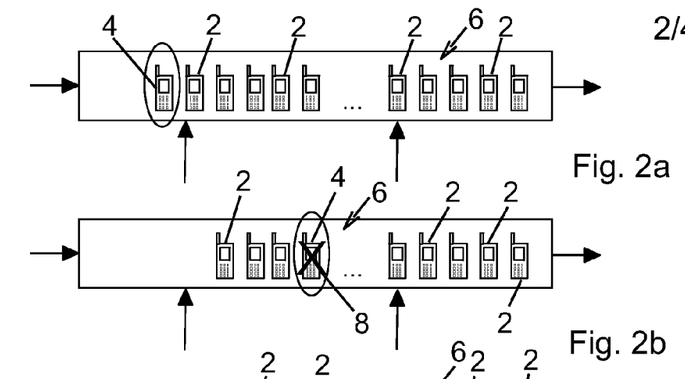
FIGS. 2a-2e is a schematic diagram of an exemplary embodiment of how a call is ranged in a waiting queue according to the invention.
Figures 2C, 2D:
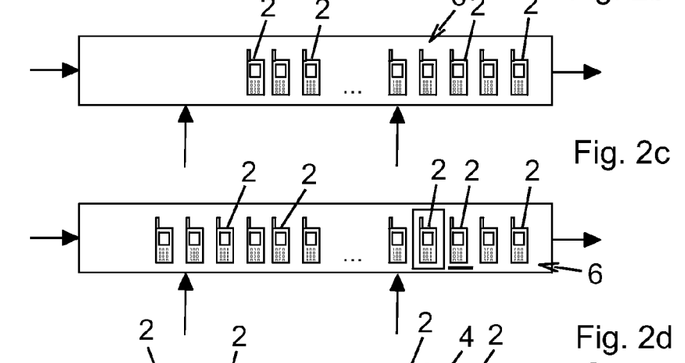
Figure 2E:
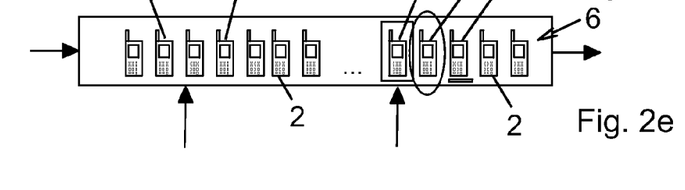

Referring to FIGS. 2a through 2e, it is explained how a first call 4 and a second call 7 are ranged in a waiting queue 6 according to the invention. For highlighting the first call 4 or the second call 7, they are respectively framed by an ellipse. The recorded time of a first call 4, for example 01:01:08 p.m., is used for determining a waiting position in the waiting queue 6. Since in the present case no other calls have come in since the time of arrival of the first call 4, the first call 4 is ranged in the waiting queue 6 at the last position. This is symbolically represented in FIG. 2a. After a predetermined waiting time of 120 seconds has elapsed, the call 4 which has meanwhile advanced by five positions in the waiting queue 6, as symbolically represented in FIG. 2b, is ended. The terminating of the call 4 is symbolically represented by the cross 8. By ending 8 the first call 4, the call 4 is no more held in the waiting queue 6, as symbolically represented in FIG. 2c. When the second call 7 initiated by the system is accepted, the waiting position in the waiting queue 6 will be determined by means of the recorded time of arrival of the first call 4 and the corresponding allocation to the call number used for the initiation of the second call 7. For this, the system compares the recorded time of arrival of the first call 4 which is allocated to the call number to the times of arrival of other calls 2 or to the times of the respective first calls which are allocated to the other calls 2. Herein, the system detects that the first call 4 has come in at a time after call 2 which is marked by an underscore in FIG. 2d (the time 01:00:56 pm is for example allocated to this call 2) and before another call 2 marked by a rectangle (the time 01:01:29). As represented in FIG. 2e, the second call 7 is thus ranged by the system between the other calls 2 which a correspondingly highlighted by an underscore or a rectangle, thus in the present case at the fourth position in the waiting queue 6.

Figure 3:
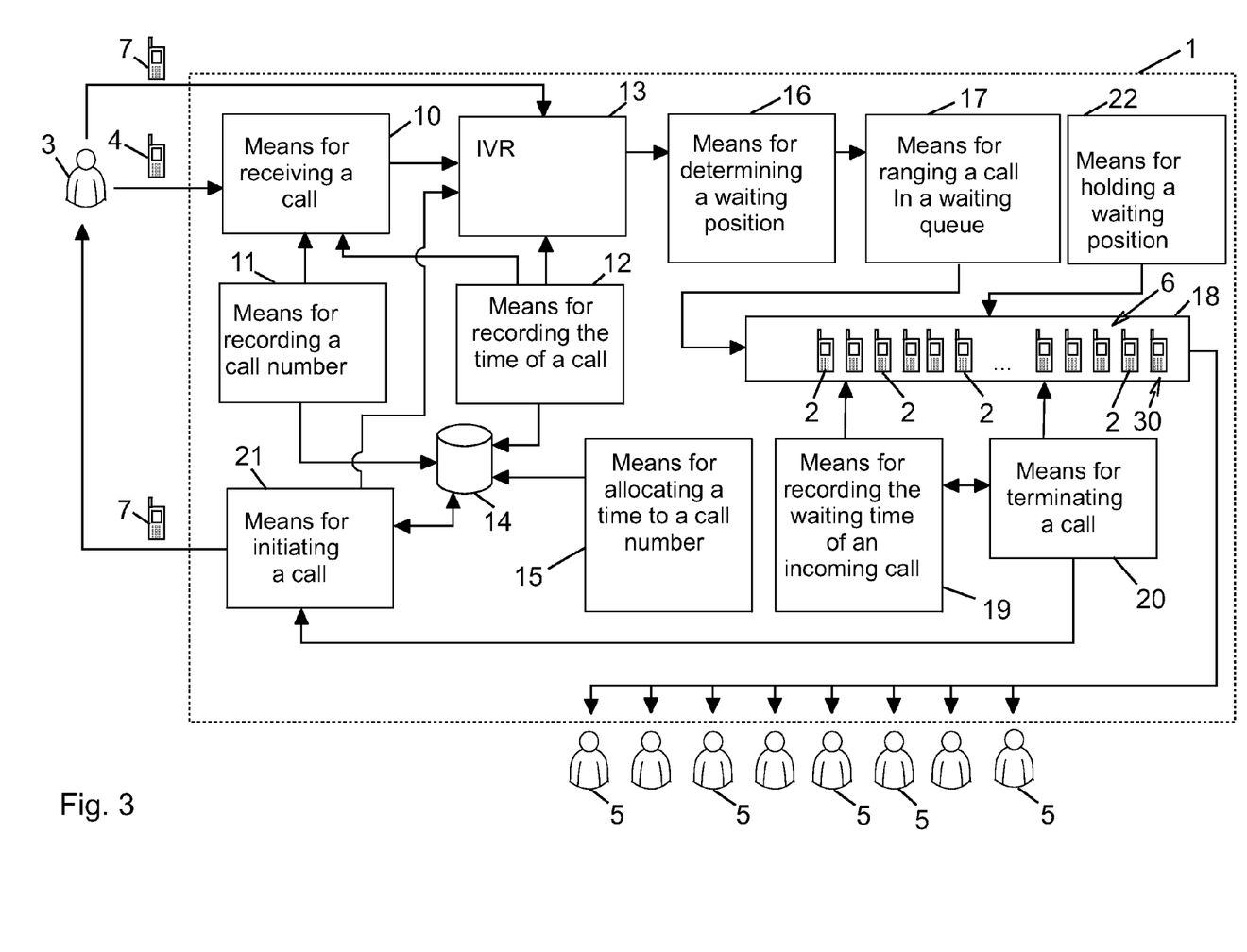
FIG. 3 is a schematic diagram of another exemplary embodiment of a system according to the invention during execution of a method according to the invention.

FIG. 3 is a schematic diagram which represents another exemplary embodiment of a system 1 according to the invention which is designed to execute a method according to the invention. Complementarily to the exemplary embodiment represented in FIG. 1, the system 1 in FIG. 3 comprises means 22 for holding a waiting position. As explained with respect to FIG. 1, the system 1 according to FIG. 3 also determines the waiting position of a first call 4 in consideration of the time of arrival of the first call 4. The system 1 according to FIG. 3 uses the means 22 for holding a waiting position for allocating the waiting position determined with respect to the first call 4 to the recorded call number and ranging the second call 7 in the waiting queue 6 in correspondence to the waiting position allocated to the recorded call number. The operation of ranging the first call 4 or the second call 7 in the waiting queue is explained in detail with reference to FIG. 4a through FIG. 4e and is not explicitly represented in FIG. 3. The means 22 for holding a waiting position in the waiting queue 6 are furthermore configured to respectively adapt a waiting position allocated to a recorded call number correspondingly if calls 2 held in the waiting queue are forwarded. Furthermore, the means 22 for holding a waiting position are configured to hold a waiting position allocated to a recorded call number, which has advanced to the first position in the waiting queue 6 and is thus entitled to be forwarded to the next available call center agent 5, for a recorded call number even if the first call 4 was ended and a second call 7 has not been accepted yet. For this, the waiting position will be reserved by a placeholder allocated to the call number (not explicitly represented in FIG. 3). Herein, a corresponding waiting position which entails immediate forwarding remains allocated to a call number until a ring back to the caller 3 has been successfully initiated or a predefined time interval has elapsed. If the predefined time interval has elapsed, the waiting position reserved by the placeholder will be de-allocated again.

Figure 4A:
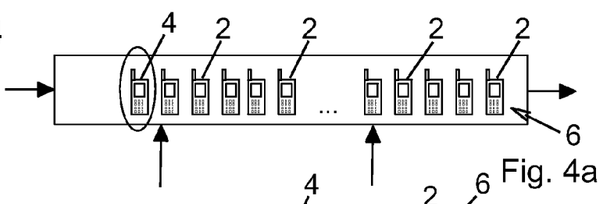
FIGS. 4a-4e is a schematic diagram of another exemplary embodiment of how calls are ranged in a waiting queue according to the invention.
Figure 4B:
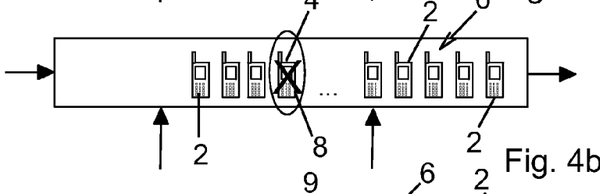
Figures 4C, 4D:
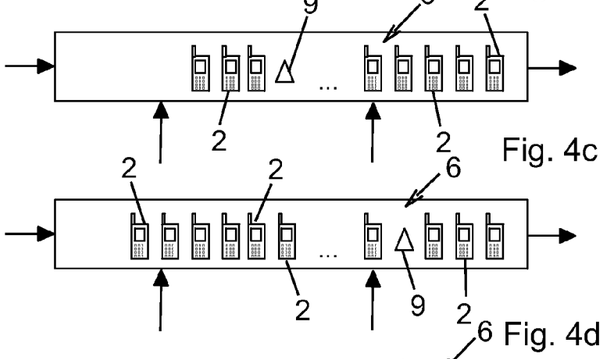
Figure 4E:
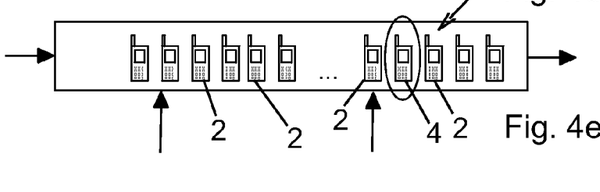

In connection to FIG. 4a through 4e another exemplary embodiment of the ranging of calls in a waiting queue 6 according to the invention will be explained, wherein the system 1 represented in FIG. 3 is designed to carry out the operation of ranging calls in a waiting queue 6 which is explained in connection to FIG. 4a through FIG. 4e. For this, a waiting position of an incoming first call 4 in the waiting queue 6 is at first determined by means 16 for determining a waiting position. Being the last call which has come in and which has not been followed by other calls yet, the first call 4 is ranged in the waiting queue 6 as last call, as represented in FIG. 4a (the first call 4 as well as the second call 7 are each highlighted by a frame in form of an ellipse). After a predefined time interval has elapsed, which time interval corresponds to the length of an announcement by a voice dialogue system 13 in the present case, in which announcement a caller 3 is informed that a call cannot be forwarded to a call center agent 5 at the moment, for which reason the call 4 will be automatically terminated such that the caller 3 does not incur any costs and a ring back to the caller 3 will be automatically initiated, the first call 4 will be ended by means 20 for ending a call (symbolically represented by the cross 8 in FIG. 4b). After having terminated 8 the first call 4 the waiting position which had been held by the first call 4 in the waiting queue 6 will be reserved by a placeholder 9 for the second call 7 to be initiated by the system 1. For this, the system 1 provides means 22 for holding a waiting position. The means 22 for holding a waiting position furthermore allow adapting the waiting position of the placeholder 9 correspondingly, when the other calls 2 which are held in the waiting queue 6 are forwarded one after the other to a call center agent 5 when a call center agent 5 is available. Concerning this operation, it is symbolically represented in FIG. 4d that the placeholder 9 has advanced to the fourth position in the waiting queue 6. If the system 1 has successfully initiated a second call 7 to the caller 3, i.e. the caller 3 has accepted the call 7 outgoing from the call center, the second call 7 will now be ranged in the waiting queue 6 in place of the placeholder 9 allocated to the call number of the caller 3 by using the means 17 for ranging a call in a waiting queue 6.

A new determination of the waiting position of the second call 7 by means of the recorded time of arrival of the first call 4 is not necessary herein.

Figure 5:
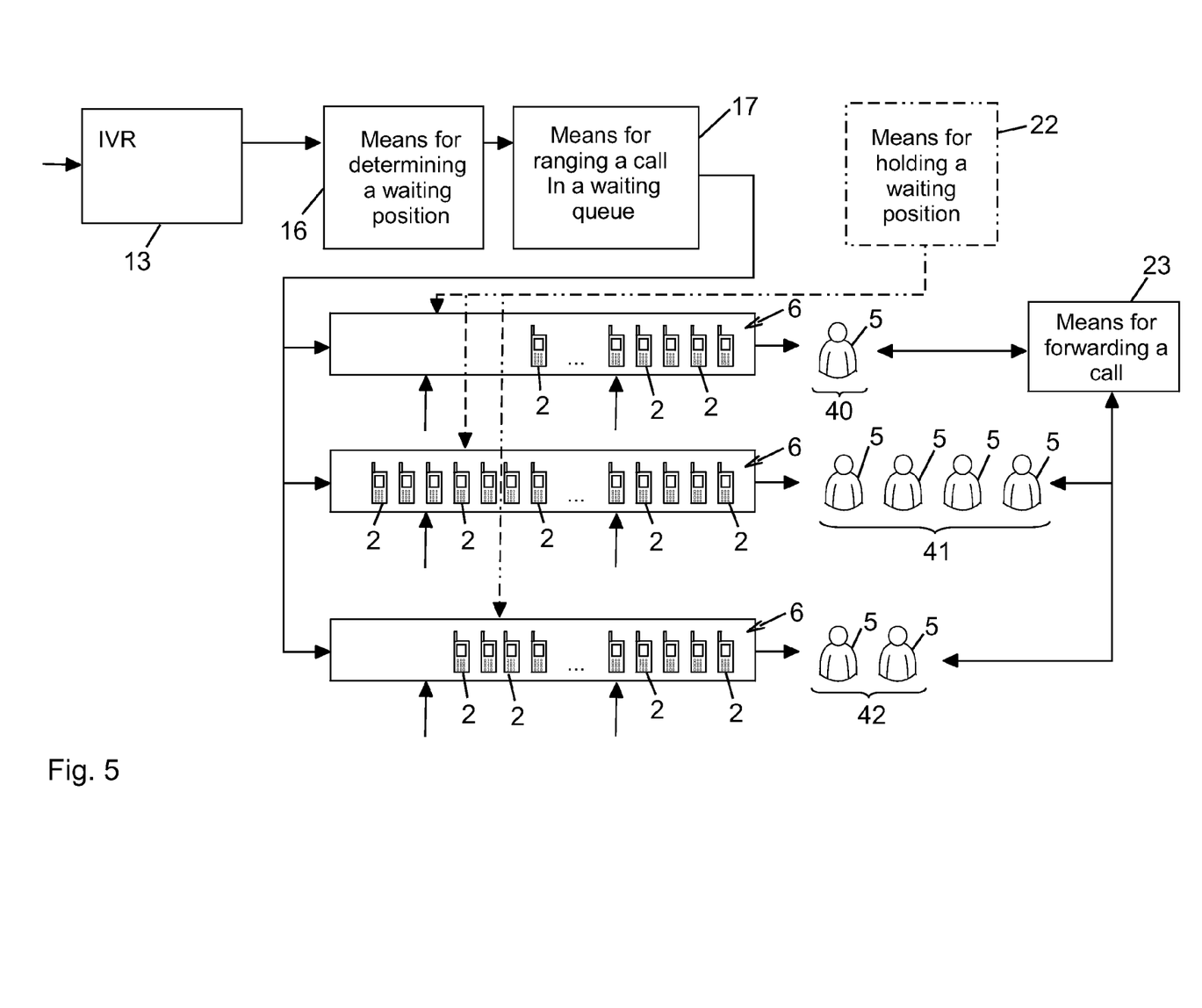
FIG. 5 is a schematic diagram of another exemplary embodiment of a part of a system according to the invention during execution of a part of the method according to the invention.

Referring to FIG. 5, an exemplary embodiment of a part of a system 1 for the administration of calls to a call center according to the invention is explained, which part is provided according to an advantageous design variant instead of the corresponding parts of the systems 1 represented in FIG. 1 or FIG. 3. Herein, respectively one group 40, 41, 42 of call center agents 5 takes care of respectively different wishes of a caller 3. One group 40 takes for example care of questions with respect to contracts, group 41 deals with technical problems and group 42 answers general questions. Herein, a waiting queue 6a, 6b, 6c for holding calls to be forwarded to call center agents 5 who belong to the respective group 40, 41, 42 is allocated to each group 40, 41, 42 of call center agents 5.

According to a first design variant which comprises means 22 for holding a waiting position, a waiting position in the respective waiting loops 6a, 6b, 6c, is respectively determined for an incoming first call 4 in consideration of the recorded time of arrival of the first call 4 and the call 4 or a corresponding placeholder (not explicitly represented in FIG. 5) is ranged in each of the waiting queues 6a, 6b, 6c. The first call 4 is advantageously ranged in that waiting queue 6a, 6b, 6c which forwards a call 4 to the group of call center agents 5 which has been determined as the most appropriate one by the voice dialogue system 13 in consideration of the whishes expressed by the caller 3. Thus, it is provided that the voice dialogue system 13 can ask the caller 3 directly whether he needs help with respect to contracts, technical help or help with respect to general matters. If the caller 3 answers thereupon with "help with respect to technical problems", the call will be automatically ranged in waiting queue 6b. In addition, a placeholder is respectively ranged in the waiting queues 6a and 6c, the waiting position of which will be adapted in consideration of calls which have been forwarded from the waiting queue 6a, 6c. If the call of the caller 3 which is held in the waiting queue 6b is forwarded to a call center agent 5 of the group 41 and if the call center agent 5 discovers that the wishes of the caller 3 are covered by the province of the call center agents 5 of group 42, the call center agent 5 of group 41 can forward the call 4 or 7 to the corresponding waiting queue 6c by using the means 23 for forwarding a call. Herein, the call of the caller 3 is advantageously not ranged at the end of the waiting queue, but at the position where the placeholder of the corresponding call is located. If a call is terminated by the caller 3 or by a call center agent 5, placeholders reserved for the call in the waiting queues 6a, 6b, 6c will be deleted by the system 1.

According to a second design variant, the system 1 does not comprise any means 22 for holding a waiting position. The call 4 or 7 is ranged in the waiting queue 6a, 6b, 6c determined by the voice dialogue system 13. The time of arrival of the first call 4 allocated to the call numbers of the caller 3 remains memorized. If the call 4 or 7 has been forwarded to a call center agent 5, for example to a call center agent 5 of group 40 and if this call center agent 5 forwards the call to a call center agent 5 of group 42 by using the means 23, the waiting position of the forwarded call in the waiting queue 6c will be determined by using the time of arrival of the first call 4. Hereby, the caller 3 has advantageously not to suffer from the disadvantage to be ranged again at the end of a corresponding waiting queue, if he was allocated to a wrong group of call center agents 5.

The exemplary embodiments of the invention which have been represented in the figures and described in relation to these ones only serve to explain the invention and are not limiting to this one.

LIST OF REFERENCE NUMERALS 1 system for the administration of calls to a call center
2 calls
3 caller
4 first call
5 call center agent
6 waiting queue
6a waiting queue
6b waiting queue
6c waiting queue
7 second call
8 terminating a call
9 placeholder
10 means for receiving a call
11 means for recording a call number
12 means for recording the time of a call
13 voice dialogue system (IVR)
14 database
15 means for allocating a time to a call number
16 means for determining a waiting position
17 means for ranging a call in a waiting queue (6)
18 means for holding calls in a waiting queue (6)
19 means for recording the waiting time of an incoming call (4)
20 means for terminating a call (4)
21 means for initiating a call (7)
22 means for holding a waiting position
23 means for forwarding a call
30 waiting position 1 which entitles to forward the call to the next available call center agent (5)
40 group of call center agents (5)
41 group of call center agents (5)
42 group of call center agents (5)

What is claimed is:

1. A method for operation of a system for administration of calls to a call center,
wherein a first call initiated by a caller using a call number allocated to the call center is automatically received by the system, the first call is held in a waiting queue comprising other calls waiting to be forwarded to a call center agent until it is forwarded by the system to a call center agent, a waiting position with respect to the first call is determined in the waiting queue by the system, the first call is ranged by the system in the waiting queue corresponding to the determined waiting position, and the calls held in the waiting queue are forwarded by the system one after the other to a call center agent if such an agent is available,
wherein the waiting positions of the calls which are still held in the waiting queue are respectively adapted by the system,
a call number of the caller is recorded by the system with the first call, the first call is terminated by the system within a predetermined time interval if the call has not been forwarded, characterized in that terminating the first call by the system initiates a second call to the caller by the system immediately after having terminated the first call initiated by the caller by using the recorded call number and if the second call is answered, the second call will be ranged in the waiting queue by the system, wherein the waiting position within the waiting queue is determined in consideration of the first call.

2. A method according to claim 1, characterized in that the channel used by the first call for a communication connection between the caller and the call center will be reserved for the second call and will be used for a communication connection from the call center to the caller after the system has ended the first call.

3. A method according to claim 1, characterized in that the channel used by the first call for a communication connection between the caller and the call center will be reserved for the second call and will be used for a communication connection from the call center to the caller after the system has ended the first call.

4. A method according to claim 1, characterized in that the time of arrival of the first call is recorded and the waiting position in the waiting queue is determined in consideration of the recorded time.

5. A method according to claim 4, characterized in that the time of arrival of the first call is allocated to the recorded call number, the waiting position of the second call in the waiting queue is determined by the time allocated to the call number and the second call is ranged in the waiting queue according to the determined waiting position.

6. A method according to claim 4, characterized in that the waiting position which has been determined with respect to the first call is allocated to the recorded call number and the second call is ranged in the waiting queue corresponding to the waiting position allocated to the recorded call number.

7. A method according to claim 1, characterized in that the waiting position which has been determined with respect to the first call is allocated to the recorded call number and the second call is ranged in the waiting queue corresponding to the waiting position allocated to the recorded call number.

8. A method according to claim 1, characterized in that the waiting position is determined in consideration of still other criteria.

9. A method according to claim 8, characterized by the frequency of calls initiated by the caller, a pre-determinable status allocated to a call number of a caller and/or a total waiting time in the waiting queue of the system which results from several calls of a caller as other criteria.

10. A method according to claim 9, characterized in that a waiting position allocated to a recorded call number is correspondingly adapted each time when calls held in the waiting queue are forwarded.

11. A method according to claim 8, characterized in that a waiting position allocated to a recorded call number is correspondingly adapted each time when calls held in the waiting queue are forwarded.

12. A method according to claim 6, characterized in that a waiting position allocated to a recorded call number is correspondingly adapted each time when calls held in the waiting queue are forwarded.

13. A method according to claim 1, characterized in that upon initiation of the first call, the call number allocated to the terminal of the caller will be transmitted to the system via a communication connection established between the terminal and the call center.

14. A method according to claim 1, characterized in that the received first call is connected to a voice dialogue system.

15. A method according to claim 14, characterized in that the caller is requested in a dialogue with the voice dialogue system to enter a call number for recording a caller's call number.

16. A method according to claim 1, characterized in that the received first call is connected to a voice dialogue system.

17. A method according to claim 1, characterized in that if the second call is not answered, at least one further call will be initiated by the system.

18. A system for the administration of calls to a call center, characterized by means for carrying out a method according to claim 1.

* * * * *